US008412827B2

(12) United States Patent  (10) Patent No.: US 8,412,827 B2
Caldwell et al.  (45) Date of Patent: Apr. 2, 2013

(54) APPARATUS AND METHOD FOR PROVIDING COMPUTING RESOURCES

(75) Inventors: Bryan Caldwell, Peachtree, GA (US); Fariborz Behi, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 568 days.

(21) Appl. No.: 12/634,723

(22) Filed: Dec. 10, 2009

(65) Prior Publication Data

US 2011/0145410 A1 Jun. 16, 2011

(51) Int. Cl.
*G06F 15/173* (2006.01)
(52) U.S. Cl. ........ 709/226; 709/200; 709/218; 718/102; 718/103
(58) Field of Classification Search .................. 709/200, 709/219, 226; 718/102, 103
See application file for complete search history.

(56) References Cited

U.S. PATENT DOCUMENTS

| | | | | | |
|---|---|---|---|---|---|
| 6,088,363 | A | * | 7/2000 | Shiobara | 370/461 |
| 7,472,159 | B2 | * | 12/2008 | Freimuth et al. | 709/203 |
| 7,562,362 | B1 | * | 7/2009 | Paquette et al. | 718/102 |
| 7,594,032 | B2 | * | 9/2009 | Thomas | 709/246 |
| 7,617,515 | B1 | * | 11/2009 | Laksono | 725/93 |
| 7,702,796 | B2 | * | 4/2010 | Shen et al. | 709/227 |
| 7,703,101 | B2 | * | 4/2010 | Cuomo et al. | 718/104 |
| 7,933,249 | B2 | * | 4/2011 | Amalfitano | 370/335 |
| 8,140,552 | B2 | * | 3/2012 | Tagami et al. | 707/758 |
| 2002/0083117 | A1 | * | 6/2002 | Goddard | 709/103 |
| 2002/0138172 | A1 | * | 9/2002 | Bahri et al. | 700/217 |
| 2003/0022404 | A1 | * | 1/2003 | Kawamura | 438/14 |
| 2003/0050955 | A1 | * | 3/2003 | Eatough et al. | 709/201 |
| 2003/0061353 | A1 | * | 3/2003 | Johnson et al. | 709/226 |
| 2003/0074387 | A1 | * | 4/2003 | Tanaka | 709/103 |
| 2003/0097443 | A1 | * | 5/2003 | Gillett et al. | 709/225 |
| 2003/0172014 | A1 | * | 9/2003 | Quackenbush et al. | 705/35 |
| 2003/0182437 | A1 | * | 9/2003 | Kobayashi et al. | 709/232 |
| 2003/0204603 | A1 | * | 10/2003 | Buchanan et al. | 709/228 |
| 2004/0205108 | A1 | * | 10/2004 | Tanaka | 709/201 |
| 2004/0230675 | A1 | * | 11/2004 | Freimuth et al. | 709/223 |
| 2005/0125274 | A1 | * | 6/2005 | Nastacio et al. | 705/8 |
| 2005/0187805 | A1 | * | 8/2005 | English | 705/8 |
| 2005/0228855 | A1 | * | 10/2005 | Kawato | 709/200 |
| 2006/0218279 | A1 | * | 9/2006 | Yamaguchi et al. | 709/226 |
| 2007/0016907 | A1 | * | 1/2007 | Benedetti et al. | 718/104 |
| 2007/0050477 | A1 | * | 3/2007 | Isaacs | 709/219 |
| 2008/0080486 | A1 | * | 4/2008 | Kim et al. | 370/352 |
| 2008/0178186 | A1 | * | 7/2008 | Capek et al. | 718/103 |
| 2008/0222640 | A1 | * | 9/2008 | Daly et al. | 718/103 |
| 2008/0270521 | A1 | * | 10/2008 | Shen et al. | 709/203 |
| 2009/0083806 | A1 | * | 3/2009 | Barrett et al. | 725/86 |
| 2009/0144784 | A1 | * | 6/2009 | Li et al. | 725/97 |
| 2009/0328048 | A1 | * | 12/2009 | Khan et al. | 718/102 |
| 2010/0067378 | A1 | * | 3/2010 | Cohen et al. | 370/231 |
| 2010/0098011 | A1 | * | 4/2010 | Pelletier et al. | 370/329 |
| 2010/0205607 | A1 | * | 8/2010 | Shivanna et al. | 718/103 |
| 2010/0325637 | A1 | * | 12/2010 | Radmilac et al. | 718/104 |
| 2011/0067032 | A1 | * | 3/2011 | Daly et al. | 718/103 |
| 2011/0161294 | A1 | * | 6/2011 | Vengerov et al. | 707/637 |

\* cited by examiner

*Primary Examiner* — John Follansbee
*Assistant Examiner* — Anthony Mejia
(74) *Attorney, Agent, or Firm* — Guntin & Gust, PLC; Andrew Gust

(57) ABSTRACT

A system that incorporates teachings of the present disclosure may include, for example, a server having a controller to receive a request from a client server for computing resources associated with a processor, determine an estimated completion time associated with previous requests associated with the processor, calculate a priority value for the request based on the estimated completion time, establish a processing schedule for the request and other requests associated with the processor based on the priority value, and provide the request to the processor according to the processing schedule. Other embodiments are disclosed.

20 Claims, 5 Drawing Sheets

300

400

APPARATUS AND METHOD FOR PROVIDING COMPUTING RESOURCES

FIELD OF THE DISCLOSURE

The present disclosure relates generally to communication systems and more specifically to an apparatus and method for providing computing resources.

BACKGROUND

Network components are often called upon to handle computer processing on behalf of a number of different client devices. The schedule with which the processing occurs can greatly effect the efficiency of both the client devices and the overall network.

DETAILED DESCRIPTION

One embodiment of the present disclosure can entail a computer-readable storage medium comprising computer instructions to receive a request from a client server for computing resources associated with a processor, determine an estimated completion time associated with previous requests associated with the processor, determine if a self-priority is assigned to the request by the client server where the self-priority designates an order of processing among requests from the client server to the processor, calculate a priority value for the request based on the estimated completion time and the self-priority, establish a processing schedule for the request and other requests associated with the processor based on the priority value, provide the request to the processor according to the processing schedule, receive a response from the processor where the response comprises information generated according to the request, and provide the response to the client server.

Another embodiment of the present disclosure can entail a server having a controller to receive a request from a client server for computing resources associated with a processor, determine an estimated completion time associated with previous requests associated with the processor, calculate a priority value for the request based on the estimated completion time, establish a processing schedule for the request and other requests associated with the processor based on the priority value, and provide the request to the processor according to the processing schedule.

Yet another embodiment of the present disclosure can entail a method including generating a request at a client server for computing resources associated with a processor, transmitting the request to a scheduling server for prioritization of the request with respect to one or more other requests associated with the processor where the prioritization is based on an estimated completion time associated with previous requests associated with the processor, and receiving at the client server a response to the request from the scheduling server, where the response is generated by the processor based on the request.

The exemplary embodiment can include mediating requests to processor resources and an algorithm for providing scheduling of those requests. In one embodiment, the algorithm can take into account the client requested priority as well as the performance of the processor at processing the request. The performance can be adjusted in real-time. The mediating component can be tunable in a number of ways including by allowing a limited number of in-flight requests and a limited number of requests, per client, of a given priority.

Figure 1:
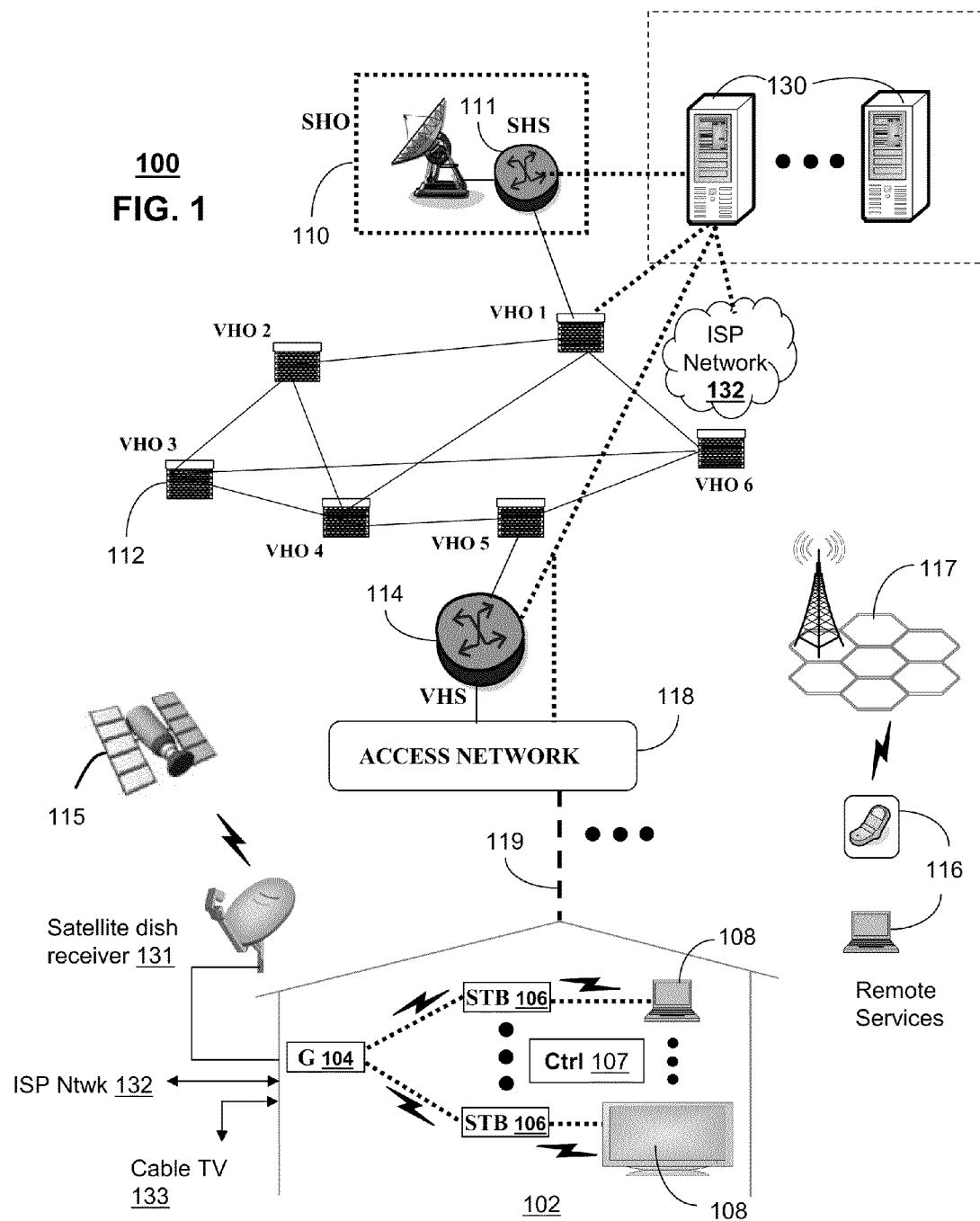
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the servers 130 can be network components or appliances that control access to computing resources. For example, the servers 130 can be placed between a requestor and a resource in order to provide throttling and queuing algorithms to control access to that resource. Requests to a resource can be queued by priority and the average time-of-flight for previous requests to that resource. This enables the request to be throttled based on near real-time information about the responsiveness of that resource. The servers 130 also allow user control through the use of user set priority. The servers 130 can manage access to a limited resource by a variety of requestors. In one embodiment, the servers 130 can provide for a single control point to that resource, such that access to the resource can be tuned based on traffic and required performance. Often each individual requestor application is responsible for queuing and throttling of requests, but each requestor does not have knowledge of other requestors. Alternately, the resource itself may be responsible for handling a large number of concurrent requests from a variety of requestors. Some resources are too low-level or specialized to adequately provide those services internally. The servers 130 can provide those services transparent to the resource as an external device placed between the requestors and the resource.

The servers 130 provide an external/decoupled method of providing throttling and queuing to a low-level or specialized resource that lacks those capabilities. The algorithm used allows user control of queuing through user defined priorities, but also take into account the near real-time behavior of the resource. If the resource is busy, requests to the resource can be throttled downward.

Figure 2:
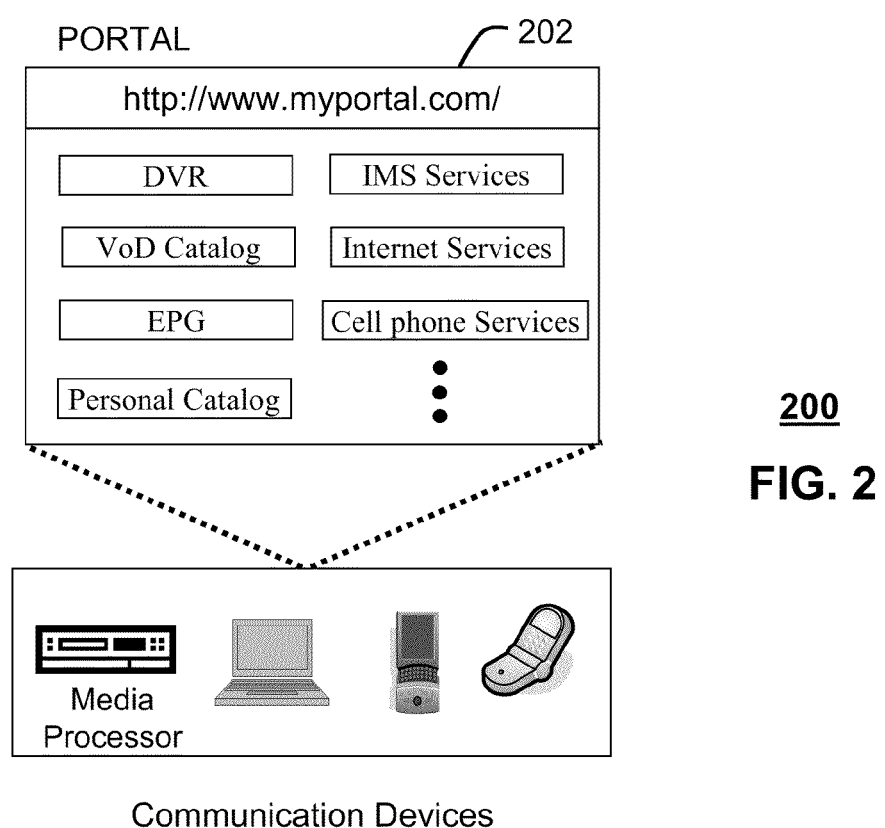
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
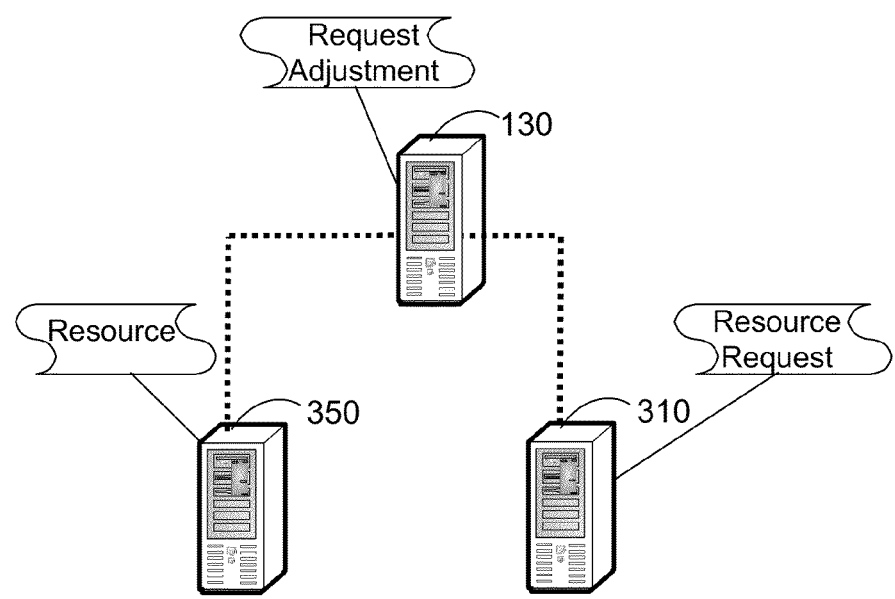
FIG. 3 depicts an illustrative embodiment of a communication system that provides computing resources.

FIG. 3 depicts an exemplary embodiment of a system 300 that can perform a number of functions, such as delivering media content, although the present disclosure is not intended to be limited thereto. System 300 can be overlaid or operably coupled with communication system 100 as another representative embodiment of said communication systems. System 300 can include a first server or client 310, a second server or appliance 130 (e.g., a scheduling server) and a third server or source 350. The client 310 can generate a request for a resource to be provided by the source 350. For example, the source can be one or more of routers, switches, multiplexers and other components where sharing of limited resources is desired, without the risk of starvation.

When an incoming resource request is received by the server 130, it can be placed in the buffer (such as a database). The type of request and the target can be classified as $R_{TX}$. The requested priority can also be recorded. The availability of the requested priority can be compared against the maximum number allowed in-flight for that client 310 and, based on that availability, assignment of the priority P' can be performed. The value of $t_e (R_{TX})$ can then be calculated for the request. Concurrently, for each source server 350, the buffer can be searched for requests targeted to that source server 350 with the minimum priority value. In one embodiment, requests can be sent while the number of in-flight requests for that source server 350 is less than the maximum defined for that source server 350. The request can be received by the source server 350, processed and returned to the server 130. The server 130 can record the actual completion time (the time it was in-flight) and the response (e.g., the resulting data or resource) can then be returned to the client 310. The estimated completion value can be adjusted dynamically based on the recent response for the given request type and source server 350.

Figure 4:
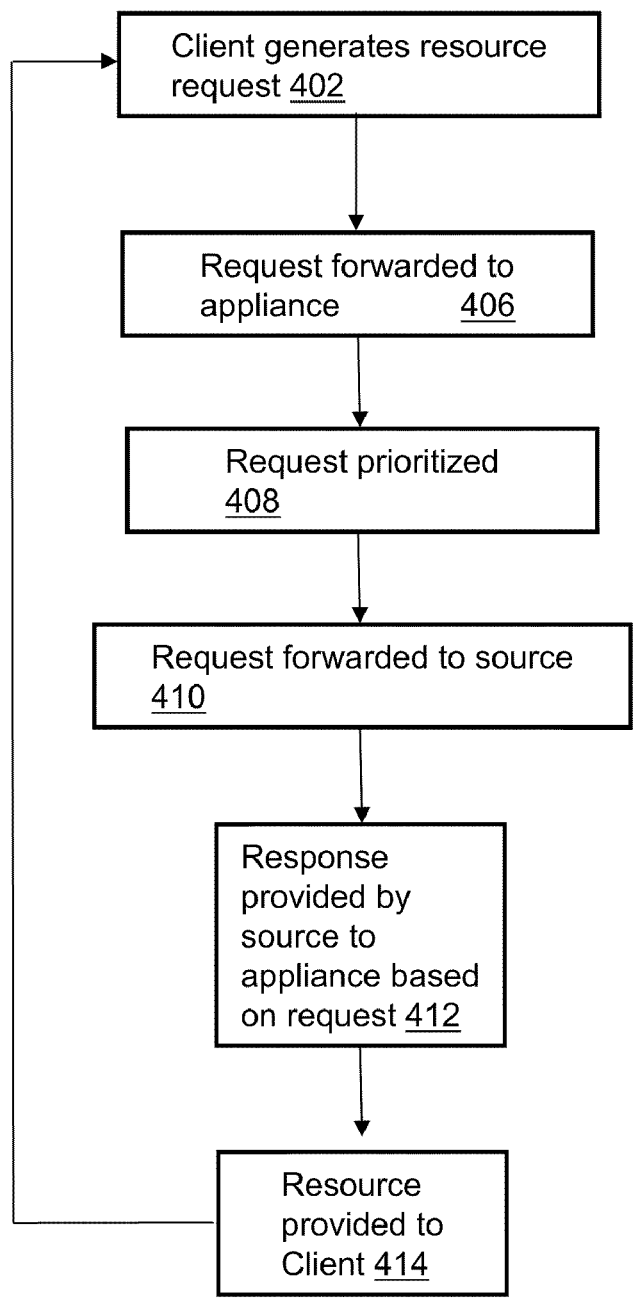
FIG. 4 depicts an illustrative embodiment of a method operating in portions of the systems of FIGS. 1 and 3.

FIG. 4 depicts an illustrative method 400 operating in portions of communication systems 100 and 300. Method 400 can begin with step 402 in which a first server generates a request for use of a computing resource. In step 406, the request can be forwarded to an intermediate server or appliance by the first server. In step 408, the intermediate appliance can process the request among a group of requests directed to the same computing resource as well as other computing resources.

In one embodiment, each dataflow can be weighted by its priority. For instance, P can be a Priority where P[0,9] and which follows the scheme of 0 being low priority with 9 being high priority. P' can equal $P_{max}$–P (in this case 9–P). For a particular request of type T, targeting Processor X, defined as $R_{TX}$, we can calculate the estimated completion time, $t_e (R_{TX})$ as the average of the actual completion time of previously processed $R_{TX}$. A window of time (previous 10 minutes, for example) or number of completed requests (only include previous 3, for example), can be established to include in this average, to allow a more real-time estimate of $t_e(R_{TX})$. The request can then be selected which has the minimum $P't_e(R_{TX})$ as the next request to be serviced by processor X.

Considering requests targeting a particular processor, X; since the highest priority, $P_{max}$, will result in $P't_e(R_{TX})=0$, requests with $P_{max}$ can be processed first (if there are multiple such requests, they can be serviced FIFO). Long running tasks, where previous requests have taken a long time to complete relative to other requests in the buffer, can be serviced after shorter running tasks of the same priority. In one embodiment, for requests targeting a particular processor all with priority P, Fair Queuing can be utilized, and if these requests are of the same type and arrive simultaneously, FIFO can be utilized.

Once the prioritization is determined then in step 410 the request can be forwarded to the source server. In step 412, a response based on the request can be returned from the source server to the intermediate appliance. The response can be the data resulting from use of the computing resource. The response or result of the resource can then be provided to the requesting client in step 414.

The present disclosure can include external clients seeking to send requests to targeted processors, which will process the request and return it to the client. Requests can be mediated through the intermediate appliance to achieve efficient utilization of the limited resources provided by the processors. The data flow can include requests being generated from the clients, targeted to a particular, external processor; the request can be sent to the intermediate appliance; the intermediate appliance can forward requests to the processor that is specified in the request; the processors can process the request and return the response to the intermediate appliance; and the intermediate appliance can forward the response back to the clients.

The intermediate appliance can prioritize the requests such that a single processor is processing the most urgent requests in a timely manner, but also such that each client has a chance of utilizing the processor. It is worth noting that since responses are passed back through the intermediate appliance, calculation of an accurate time of completion of each request is possible.

Upon reviewing the aforementioned embodiments, it would be evident to an artisan with ordinary skill in the art that said embodiments can be modified, reduced, or enhanced without departing from the scope and spirit of the claims described below. For example, clients may request a specific priority, so that a client may choose which of it's requests should be serviced first. The intermediate appliance may limit the overall number of in-flight requests (those sent to the processor, but which no response has been returned) to a given processor. The intermediate appliance may limit the number of in-flight requests with a requested priority from a particular client to a given processor. (For example Client-A may only be allowed to have 2 high priority Requests in-flight for Processor-X).

Other suitable modifications can be applied to the present disclosure without departing from the scope of the claims below. Accordingly, the reader is directed to the claims section for a fuller understanding of the breadth and scope of the present disclosure.

Figure 5:
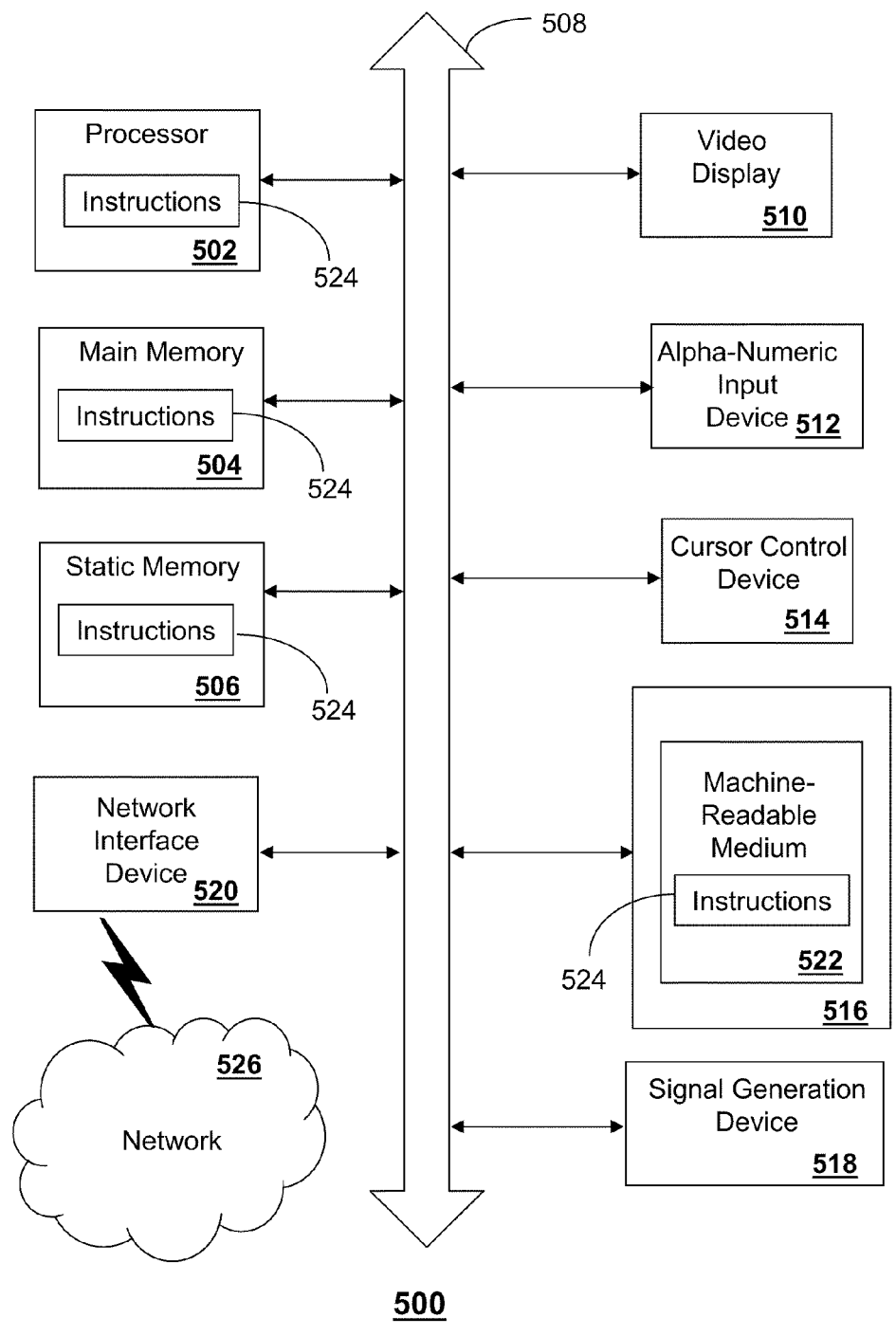
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising computer instructions which, responsive to being executed by a processor of a scheduling server, cause the processor to perform operations comprising:
   receiving a request from a client server for computing resources associated with a processor;
   receiving completion data from the processor for previous completed requests for the computing resources associated with the processor;
   determining an estimated completion time associated with previous unresolved requests that have been provided to the processor, wherein the estimated completion time is determined based on the completion data;
   determining if a self-priority is assigned to the request by the client server, the self-priority designating an order of processing among requests from the client server to the processor, wherein a number of self-priorities assignable by the client server is limited by the scheduling server;
   calculating a priority value for the request based on the estimated completion time and the self-priority;
   establishing a processing schedule for the request and other requests associated with the processor based on the priority value;
   providing the request to the processor according to the processing schedule;
   receiving a response from the processor, the response comprising information generated according to the request; and
   providing the response to the client server.

2. The non-transitory computer-readable storage medium of claim 1, wherein the estimated completion time is determined based on a pre-determined number of previous requests.

3. The non-transitory computer-readable storage medium of claim 1, wherein the estimated completion time is determined based on requests during a pre-determined time period.

4. The non-transitory computer-readable storage medium of claim 1, comprising computer instructions to monitor a number of unresolved requests directed to the processor that are received from the client server and reject a subsequent request from the client server for the computing resources of the processor responsive to the number of unresolved requests exceeding a threshold.

5. The non-transitory computer-readable storage medium of claim 1, comprising computer instructions to determine a completion time associated with the request and utilize the completion time to determine another estimated completion time associated with another request.

6. The non-transitory computer-readable storage medium of claim 1, comprising computer instructions to determine unresolved requests associated with the client server.

7. A server comprising:
   a memory storing computer instructions; and
   a controller coupled with the memory, wherein the controller, responsive to executing the computer instructions, performs operations comprising:
   receiving a request from a client server for computing resources associated with a processor;
   receiving completion data from the processor for previous completed requests for the computing resources associated with the processor;
   determining an estimated completion time associated with previous unresolved requests that have been provided to the processor, wherein the estimated completion time is determined based on the completion data;
   calculating a priority value for the request based on the estimated completion time;
   establishing a processing schedule for the request and other requests associated with the processor based on the priority value; and
   providing the request to the processor according to the processing schedule.

8. The server of claim 7, wherein the controller is adapted to:
  determine if a self-priority is assigned to the request by the client server, the self-priority designating an order of processing among requests from the client server to the processor, wherein a number of self-priorities assignable by the client server is limited by the controller; and
  calculate the priority value for the request based on the estimated completion time.

9. The server of claim 7, wherein the controller is adapted to:
  receive a response from the processor, the response comprising information generated according to the request; and
  provide the response to the client server.

10. The server of claim 7, wherein the controller is adapted to determine a completion time associated with the request and utilize the completion time to determine another estimated completion time associated with another request.

11. The server of claim 7, wherein the estimated completion time is based on a pre-determined number of previous requests.

12. The server of claim 7, wherein the estimated completion time is based on requests during a pre-determined time period.

13. The server of claim 7, wherein the controller is adapted to identify the previous unresolved requests associated with the processor and the client server.

14. A method comprising:
  generating a request at a client server for computing resources associated with a processor;
  transmitting from the client server the request to a scheduling server for prioritization of the request with respect to one or more other requests associated with the processor, wherein the prioritization is based on an estimated completion time determined from completion data for previous completed requests associated with the processor, wherein the completion data is generated by the processor and provided to the scheduling server; and
  receiving at the client server a response to the request from the scheduling server, wherein the response is generated by the processor based on the request.

15. The method of claim 14, comprising determining a completion time associated with the request and utilizing the completion time to determine another estimated completion time associated with another request.

16. The method of claim 14, comprising:
  assigning a self-priority to the request, the self-priority designating an order of processing among requests from the client server to the processor, wherein a number of self-priorities assignable by the client server is limited by the scheduling server.

17. The method of claim 14, wherein the estimated completion time is based on a pre-determined number of previous requests.

18. The method of claim 14, wherein the estimated completion time is based on requests during a pre-determined time period.

19. The method of claim 14, comprising identifying the previous unresolved requests associated with the processor and the client server.

20. The method of claim 14, wherein the processor is at least one of a router, a switch or a multiplexer.

* * * * *